US008756580B2

(12) United States Patent
Dayan et al.

(10) Patent No.: US 8,756,580 B2
(45) Date of Patent: Jun. 17, 2014

(54) INSTANCE-BASED FIELD AFFINITY OPTIMIZATION

(75) Inventors: Alon Dayan, Kfar Saba (IL); David Joel Edelsohm, White Plains, NY (US); Olga Golovanevsky, Haifa (IL); Ayal Zaks, Misgav (IL)

(73) Assignee: International Business Machines Corporation, Armonk, NY (US)

( * ) Notice: Subject to any disclaimer, the term of this patent is extended or adjusted under 35 U.S.C. 154(b) by 869 days.

(21) Appl. No.: 12/729,321

(22) Filed: Mar. 23, 2010

(65) Prior Publication Data
US 2011/0239197 A1    Sep. 29, 2011

(51) Int. Cl.
*G06F 9/44* (2006.01)

(52) U.S. Cl.
USPC ............................................. 717/128

(58) Field of Classification Search
USPC .................. 717/127, 128, 130–132
See application file for complete search history.

(56) References Cited

U.S. PATENT DOCUMENTS

| 6,360,361 | B1* | 3/2002 | Larus et al. | 717/159 |
| 6,988,263 | B1* | 1/2006 | Hussain et al. | 717/128 |
| 2004/0193815 | A1* | 9/2004 | Haghighat et al. | 711/158 |
| 2005/0204315 | A1* | 9/2005 | Knol et al. | 716/2 |
| 2007/0083274 | A1* | 4/2007 | Krauss | 700/4 |
| 2008/0177756 | A1* | 7/2008 | Kosche et al. | 707/100 |
| 2011/0208559 | A1* | 8/2011 | Fontoura et al. | 705/7.26 |

OTHER PUBLICATIONS

Hagog, M., Tice, C. "Cache Aware Data Layout Reorganization Optimization in GCC", Proceedings of the GCC Developers' Summit, pp. 69-92, 2005. URL: http://www.gccsummit.org/.
Chakrabarti, G., Chow, F. "Structure Layout Optimizations in the Open64 Compiler:design, Implementation and Measurements" Open64 Workshop at the International Symposium on Code Generation and Optimization. 2008. URL: http://www.capsl.udel.edu/conferences/open64/2008.
Hundt, R., Mannarswamy, S., Chakrabarti, D. "Practical Structure Layout Optimization and Advice", Proceedings of the International Symposium on Code Generation and Optimization, pp. 233-244. IEEE Computer Society, Washington, 2006.
Ding, C., Zhong, Y. "Predicting Whole-Program Locality through Reuse Distance Analysis" Proceedings of the ACM SIGPLAN'03 Conference on Programming Language Design and Implementation, pp. 245-257. ACM, New York, 2003.
Olga Golovanevsky et al, "Trace-Based Data Layout Optimizations for Multi-Core Processors" IBM Haifa Research Laboratory, have been recently submitted by the authors of this patent to HiPEAC 2010 conference, Jan. 25-27, 2010. Notification: Sep. 15, 2009.
Jinseong Jeon et al., "Abstracting Access Patterns of Dynamic Memory Using Regular Expressions", ACM Transactions on Architecture and Code Optimization (TACO), vol. 5 , Issue 4 (Mar. 2009), Article No. 18, Year of Publication: 2009.
Zhong et al., "Array Regrouping and Structure Splitting Using Whole-Program Reference Affinity" Proceedings of the ACM SIGPLAN 2004 conference on Programming language design and implementation, pp. 255-266 ,AMC New York, NY, USA.

* cited by examiner

*Primary Examiner* — Anna Deng
(74) *Attorney, Agent, or Firm* — Ziv Glazberg

(57) ABSTRACT

Dynamic determination of affinity between fields of structure may be determined based on accesses to the same instance. The affinity may be utilized in determining a data layout of a structure so as to optimize performance of a target program. The affinity determination may be an estimation based upon a trace of an execution of the target program. Access relation between proximate accesses to fields of the same instance may be utilized to estimate an optimized data layout of the structure.

17 Claims, 4 Drawing Sheets

INSTANCE-BASED FIELD AFFINITY OPTIMIZATION

BACKGROUND

The present disclosure relates to performance optimizations of computer programs in general, and to compile time data layout optimizations of computer programs in particular.

Performance of a computer program may be improved based on performance optimizations methods. Such methods include modifying the computer program, also referred to as a target program, to perform in a more efficient manner such as for example to be executed more rapidly, to require less resources such as memory space or draw less power. Although referred to as optimizing performance of the target program, such methods do not necessarily provide the best possible performance. In some cases, performing an optimization may unfortunately lead to a reduction in efficiency of the target program in some executions or even unexpectedly in all executions.

Data layout optimizations are utilized to change a structure layout used in the target program so as to better correspond to data access patterns exercised by the target program. Some optimizations utilize affinity between fields of the structure to determine the structure layout in the optimized target program as to improve spacial locality. For example, a c-like structure having four fields: f1, f2, f3, f4 may be utilized by the target program by constantly accessing field f2 before accessing field f4 and by constantly accessing field f1 after accessing field f3. The affinity between fields f1 and f3 and between fields f2 and f4 may be utilized. The optimized target program may define a structure with the fields arranged in a different order, such as for example, f3, f1, f2, f4. The different data layout may take into account the order of accesses (e.g., field f3 is accessed before field f1) and the group of fields accessed in proximate instructions (e.g., fields f3 and f1 are usually accessed in together or in relatively close instructions) or the like.

Data layout optimizations may be utilized in a compiler, as is known in the art, to optimize the compiled target program. At compile time, the compiler may utilize the affinity between fields to determine a data layout associated with a structure. The data layout may be different than that defined by the target program (e.g., by the code defining the structure). The compiler may modify the target program so that the compiled target program may have the substantially the same effect as though the data layout was as defined, except for improved performance. The improved performance may be achieved due to spacial locality improvement, as is known in the art.

BRIEF SUMMARY

One exemplary embodiment of the disclosed subject matter is a computerized apparatus for determining an access relation between fields of a structure in a computer program, the computerized apparatus having a processor, the computerized apparatus comprising: a trace obtainer configured to obtain a trace associated with an execution of the computer program, the trace comprising at least one indication of access to a portion of the fields of the structure; an instance identification module configured to identify an instance of the structure accessed during the at least one indication of access; an access relation determination module configured to determine the access relation between at least two fields of the fields of the structure, wherein the access relation determination module is configured to determine the access relation based on indications of accesses to the at least two fields in the instance of the structure.

Another exemplary embodiment of the disclosed subject matter is a computer-implemented method for determining an access relation between fields of a structure in a computer program, the method comprising: obtaining a trace associated with an execution of the computer program, the trace comprising at least one indication of access to a portion of the fields of the structure; analyzing the trace, wherein the analyzing the trace is performed by a processor, wherein the analyzing the trace comprises: identifying an instance of the structure associated with the at least one indication of access; determining the access relation between at least two fields of the fields of the structure; and determining a data layout of the fields of the structure based on the access relation; compiling the computer program and utilizing the data layout.

Yet another exemplary embodiment of the disclosed subject matter is a computer program product for determining an access relation between fields of a structure in a computer program, the product comprising: a computer readable medium; a first program instruction for obtaining a trace associated with an execution of the computer program, the trace comprising at least one indication of access to a portion of the fields of the structure; a second program instruction for analyzing the trace, wherein the second program instruction comprises: a third program instruction for identifying an instance of the structure associated with the at least one indication of access; a fourth program instruction for determining the access relation between at least two fields of the fields of the structure; and a fifth program instruction for determining a data layout of the fields of the structure based on the access relation; wherein the first, second, third, fourth and fifth program instructions are stored on the computer readable medium.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
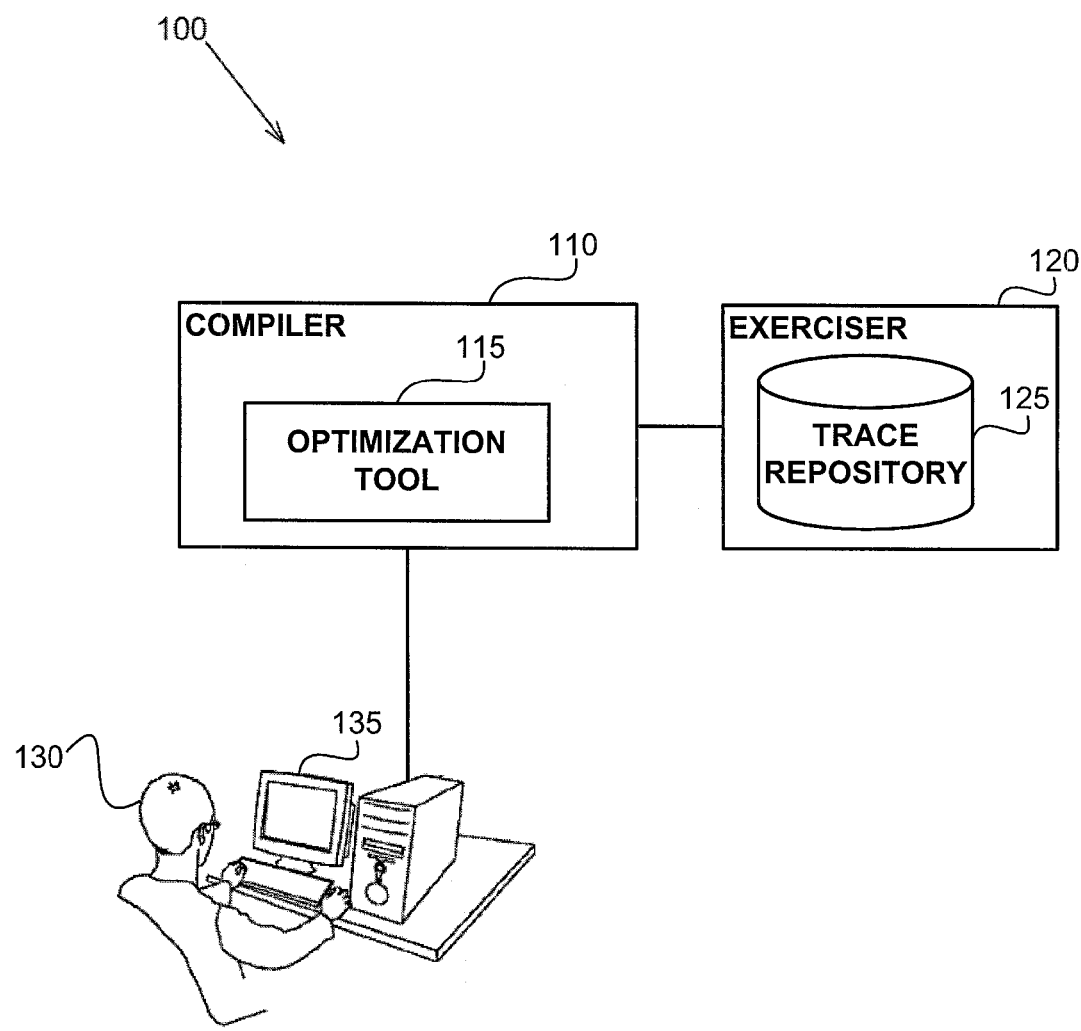
FIG. 1 shows a computerized environment in which the disclosed subject matter is used, in accordance with some exemplary embodiments of the subject matter.

The disclosed subject matter is described below with reference to flowchart illustrations and/or block diagrams of methods, apparatus (systems) and computer program products according to embodiments of the subject matter. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to estimate affinity between fields of a structure in a target program. Another technical problem dealt with by the disclosed subject matter is to differentiate accesses to fields of a structure which do not target the same instance of the structure.

One technical solution is to utilize a trace of an execution of the target program. The trace may be utilized to identify accesses to fields of an instance of the structure. The instance may be identified based on an instance identifier such as an address of the instance, an array containing the instance and a corresponding index of the instance in the array, a variable holding the instance or the like. Another technical solution is to identify accesses to fields of the same instance of the structure in proximate locations, such as within a predetermined number of accesses. Yet another technical solution is to utilize a relative compact trace. The trace may include only data accesses to fields of structures. The trace may alternatively include only data accesses to fields of a predetermined structure being analyzed.

One technical effect of utilizing the disclosed subject matter is detecting optimization opportunities based on prior operation of the target computer. Another technical effect of utilizing the disclosed subject matter is to provide for a relatively reliable estimation of field affinity, based on feedback directed analysis of the computer program. The disclosed subject matter enables analysis of both inter- and intra-iteration accesses as well as generally all types of accesses in the target program.

Referring now to FIG. 1 showing a computerized environment in which the disclosed subject matter is used, in accordance with some exemplary embodiments of the subject matter. A computerized environment 100 may comprise an optimization tool 115. The optimization tool 115 may be configured to detect optimization opportunities in a target program. The optimization tool 115 may be configured to perform field affinity estimation relating to usage of a structure by the target program. In some exemplary embodiments, the optimization tool 115 may provide an indication of possible suggested optimizations. In some exemplary embodiments, the optimization tool 115 may modify a data layout of the structure to optimize the target program.

The optimization tool 115 may provide a user 130, such as a programmer, a QA engineer or the like, an indication of the optimization opportunity. The user 130 may view the indication using a Man-Machine Interface 135, such as for example a terminal.

A compiler 110 may utilize the optimization tool 115. The compiler 110 may compile the target program and utilize the optimization tool 115 to determine the data layout of the compiled target program.

The optimization tool 115 may be configured to utilize one or more traces retained in a trace repository 125. The trace repository 125 may be stored in a storage device, such as a storage server, a hard disk, a compact disk, a memory device or the like.

An exerciser 120 may execute the target program to provide for one or more traces in accordance with the disclosed subject matter. The traces may be stored in the trace repository 125. In some exemplary embodiments, the exerciser 120 may execute the target program in response to a command by the compiler 110 or the optimization tool 115. The one or more trace outputted by the executed target program may be utilized by the optimization tool 115, which may be utilized to determine the data layout of the compiled target program. In some exemplary embodiments, the exerciser 120 may utilize a benchmark to execute the target program. The benchmark may comprise one or more tests associated with the target program. In other exemplary embodiments, the exerciser 120 may execute the target program and utilize random input or input received from another source, such as a test, upon input request from the target program. In other exemplary embodiments, a user, such as 130, may initiate execution of the target program and as a side effect, a trace may be generated. In yet other exemplary embodiments, the user may purposely execute the target program in order to generate the trace.

It will be noted that in some exemplary embodiments, the compiler 110 may instrument the compiled target program such that a trace may be generated when the compiled target program is executed. The trace may be utilized later on in accordance with the disclosed subject matter.

In some exemplary embodiments, the optimization tool 115 may analyze a trace on-the-fly, as the trace is being generated. On-the-fly analysis may eliminate a need to retain the trace. In case of a relatively big trace, retaining the trace may require allocation of resources such as storage space, time required for I/O operations and the like.

Figure 2:
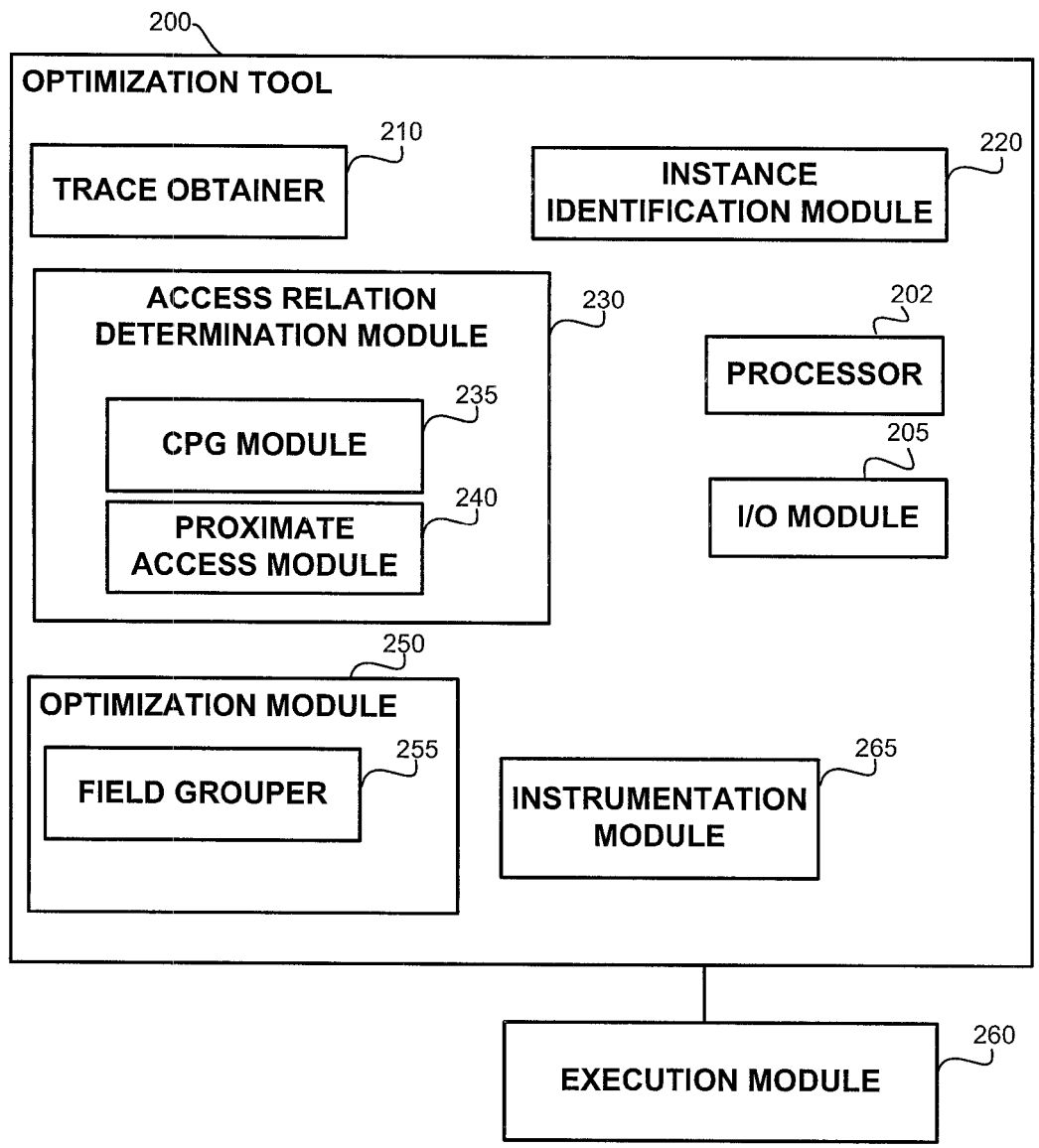
FIG. 2 shows a block diagram of an optimization tool, in accordance with some exemplary embodiments of the disclosed subject matter.

Referring now to FIG. 2 showing an optimization tool in accordance with some exemplary embodiments of the disclosed subject matter. An optimization tool 200, such as 115 of FIG. 1 may be useful for determining affinity between fields and/or in performing instance-based field affinity estimation and/or in performing data layout optimization based upon the field affinity estimation. In some exemplary embodiments, the optimization tool 200 may provide suggestions to a user, such as 130 of FIG. 1, and the user may decide whether or not to act upon the suggestions and modify the data layout. The optimization tool 200 may be configured to determine an access relation between fields of a structure in a computer program. The access relation may be an estimated relation between accesses to the fields, such as for example, a first field is accessed before a second field, a group of fields are accessed in proximity, a first field is accessed for writing in response to reading a second field, or the like.

A trace obtainer 210 may be configured to obtain a trace associated with an execution of the target program. The trace may comprise indications to accesses to fields in instances of the structure. The trace obtainer 210 may obtain the trace from a repository, such as 125 of FIG. 1. The trace obtainer 210 may obtain the trace associated with an execution initiated by an execution module 260, such as exerciser 120 of FIG. 1.

An instance identification module 220 may be configured to identify an instance of the structure accessed based upon the trace. The instance may be identified using an instance identifier. In some exemplary embodiments, the instance may be uniquely identified using the instance identifier. In some exemplary embodiments, the optimization tool 200 may be configured to determine if two accesses were performed in respect to the same instance. The optimization tool 200 may utilize the instance identification module 220 to determine whether the instance accessed by a first access is the same as the instance accessed by a second access.

In some exemplary embodiments, the instance identification module 220 may be configured to perform an algorithm such as:

```
get_addrees of a field accessed in the record based on trace;
compute sizeof in respect to all fields before the accessed field;
subtract from the address the computed sizeof;
return the outcome;
```

In some exemplary embodiments, the instance identification module 220 may be configured to perform an algorithm such as:

```
if (accessed instance is in an array) {
    determine value of index in the array based on trace;
    identification = array name."[value]";
} else {
    identification = variable name holding the instance;
}
``` return the identification;

An access relation determination module 230 may be configured to determine an access relation between pairs of fields of the structure. The access relation determination module 230 may be configured to determine the relation based on accesses performed in respect to the same instance. The access relation determination module 230 may utilize the instance identification module 220 to determine whether two accesses are in respect to the same instance. The access relation determination module 230 may determine an access relation such as an order of accesses between the fields, fields being accessed together or the like.

In some exemplary embodiments, a Close Proximity Graph (CPG) module 235 may be utilized to manipulate a CPG data structure. The CPG data structure may comprise nodes associated with fields and edges between fields that are accessed together. The edge may indicate the access relation between the pair of fields. An edge may be assigned a weight to indicate a measurement of the relation between the fields. In other exemplary embodiments, other data structures may be utilized.

In some exemplary embodiments, the access relation determination module 230 may comprise a proximate access module 240. The proximate access module 240 may be utilized to determine whether two accesses may be considered proximate and taken into account by the access relation determination module 230. The proximate access module 240 may be configured to consider two accesses performed within a predetermine number of accesses to be proximate, within a predetermined time, a combination thereof and the like. In some exemplary embodiments, the proximate access module 240 may determine one or more sets of accesses, wherein each set, also referred to as a "window", comprises accesses which may be considered proximate to one another. It will be noted that different windows may share the same accesses (i.e., the conjunction between two windows may be different than the empty set).

An optimization module 250 may be utilized to determine an optimization opportunity based upon the access relation determined by the access relation determination module 230. In some exemplary embodiments, the optimization module 250 may determine a data layout optimization opportunity. In some exemplary embodiments, the optimization module 250 may perform the optimization or enable another module, such as a compiler to utilize the determined optimization opportunity.

In some exemplary embodiments, the optimization module 250 may comprise a field grouper 255, also referred to as a field reorderer. The field grouper 255 may be configured to determine groups of associated fields in a structure. The groups may be utilized in a data layout, such as for example by listing the groups a proximity to one another, such as sequentially.

In some exemplary embodiments, the field grouper 255 may be a CPG partitioning module. The CPG partitioning module may partition the CPG into the groups based on various attributes of the CPG. In an exemplary embodiment, the CPG partitioning module may partition the CPG based on Strongly Connected Components (SCCs), as is known in the art.

In some exemplary embodiments, the optimization tool 200 may further utilize an execution module 260. The execution module 260 may initiate one or more executions of the target program in order to produce traces in accordance with the disclosed subject matter.

In some exemplary embodiments, the optimization tool 200 may comprise an instrumentation module 265. The instrumentation module 265 may instrument the target program with code that is operative to produce a trace in accordance with the disclosed subject matter. The instrumented code may provide an output associated with accesses to a specific structure, to all structures or the like. The output may include a structure being accessed, an instance indication and a field. The output may further include timestamp, type of access indication, identification of the structure, and the like.

In some exemplary embodiments of the disclosed subject matter, the optimization tool 200 may comprise an Input/Output (I/O) module 205. The I/O module 205 may be utilized by the trace obtainer 210 to receive, retrieve or otherwise obtain a trace, such as for example from a trace repository 120 of FIG. 1. The I/O module 205 may be utilized to provide an output to a user, such as 130 of FIG. 1. The output may comprise indications of the detected optimization opportunities. The I/O module 205 may be utilized to update the target program, such as for example by modifying the binary or the source code of the target program. The I/O module 205 may be utilized by the optimization module 250 to modify the target program based on optimization opportunities. The I/O module 205 may be utilized by the execution module 260 to initiate an execution of the target program. The I/O module 205 may be utilized by the instrumentation module 265 to modify the target program.

In some exemplary embodiments, the optimization tool 200 may comprise a processor 202. The processor 202 may be a Central Processing Unit (CPU), a microprocessor, an electronic circuit, an Integrated Circuit (IC) or the like. The processor 202 may be utilized to perform computations required by the optimization tool 200 or any of it subcomponents.

In some exemplary embodiments, multiple tools may provide the functionality of the optimization tool 200. For example, a first tool may provide instrumentation of the target program, a second tool may determine access relations between fields (such as for example, using a CPG) and a third tool may utilize the determined access relations to perform optimizations.

Figure 3:
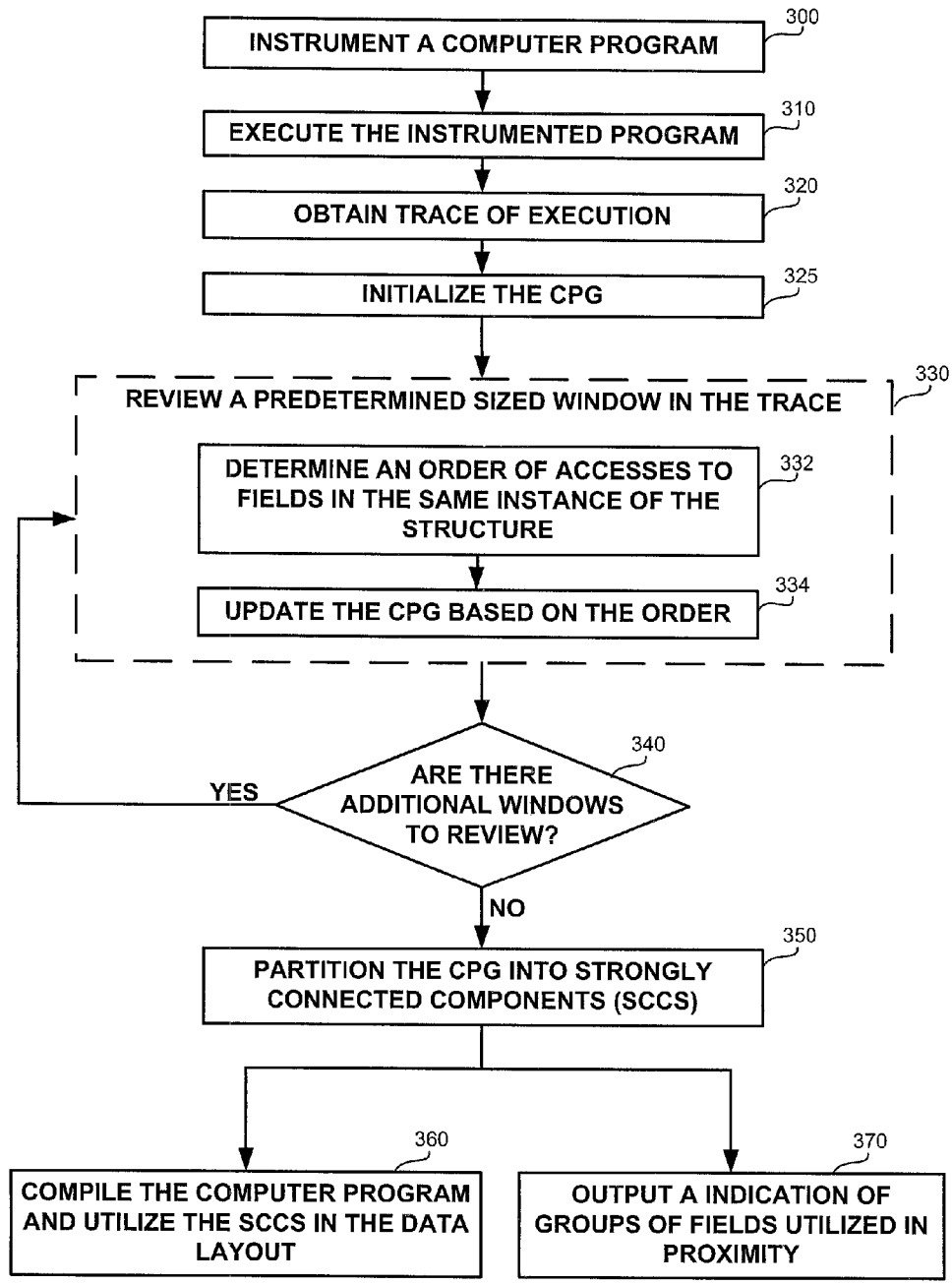
FIG. 3 shows a flowchart diagram of a method, in accordance with some exemplary embodiments of the disclosed subject matter.

Referring now to FIG. 3 showing a flowchart diagram of a method in accordance with some exemplary embodiments of the disclosed subject matter.

In step 300, a target computer program may be instrumented. The instrumentation may be configured to produce a trace with pertinent information in accordance with the disclosed subject matter. The target program may be instrumented by an instrumentation module, such as 265 of FIG. 2.

In step 310, the instrumented target program may be executed. An execution module, such as 260 of FIG. 2, may execute the instrumented target program.

In step 320, a trace of the execution may be obtained. The trace may be obtained from a trace repository, such as 120 of FIG. 1. The trace may be obtained by a trace obtainer, such as 210 of FIG. 2 which may utilize an I/O module, such as 205 of FIG. 2.

In step 325, a CPG data structure may be initialized. The CPG may be initialized by a CPG module, such as 235 of FIG. 2. In some exemplary embodiments, other data structure may be utilized to relations between data objects.

In step 330, a window of the trace may be analyzed. The window may be determined by a proximate access module, such as 240 of FIG. 2. The window may comprise accesses that may be considered proximate to one another.

In step 332, an order between accesses to fields in the same instance may be determined based on the accesses in the window. The order may be determined by an access relation determination module, such as 230 of FIG. 2. Other access relations may be determined instead of or in addition to the order.

In step 334, the CPG may be updated to include the access relation determined in step 332. A CPG module, such as 235 of FIG. 2, may be utilized to update the CPG.

In step 340, a determination may be made whether additional windows are to be reviewed. The determination may be based upon reviewing all windows of one or more traces, a reviewing at most a predetermined number of windows, utilizing predetermined amounts of resources, such as for example time, CPU cycles or other resources, or the like. In case an additional window may be reviewed, step 330 may be performed in respect to the additional window. Otherwise, step 350 may be performed.

In step 350, the CPG may be partitioned into SCCs. The partitioning may be performed by a field grouper, such as 255 of FIG. 2.

In some exemplary embodiments, step 360 may be performed. In step 360, the target program may be compiled. The compiled program may be built using a data layout for the structure. The data layout may group fields associated with the same SCC together, as is known in the art.

In some exemplary embodiments, step 370 may be performed. In step 370, an output may be provided to a user, such as 130 of FIG. 1. The output may indicate the groups determined in step 350, a suggested data layout based on the groups, a utilization statistics associated with the groups or the like.

In some exemplary embodiments, both steps 360 and 370 may be performed.

In some exemplary embodiments, the method of FIG. 3 may be performed several times, each time in respect to a different structure. In some exemplary embodiments, steps 300-320 may be performed once in such a manner that may obtain traces with information regarding pertinent structures. Steps 325-350 may be performed several times in respect to each structure. In other exemplary embodiments, the CPG may comprise nodes based on fields of different structures. In such exemplary embodiments, a relation between fields of different structures may be omitted from the CPG.

Figure 4:
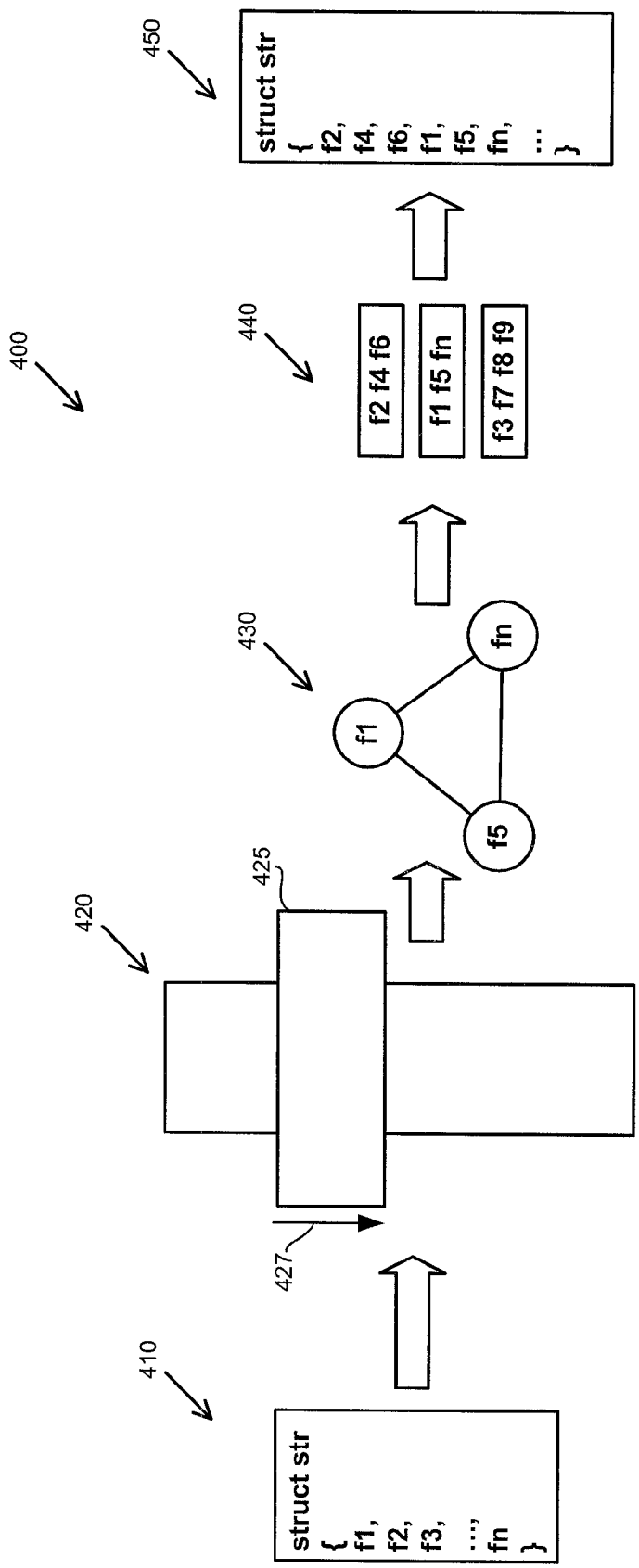
FIG. 4 shows a diagram of a method, in accordance with some exemplary embodiments of the disclosed subject matter.

Referring now to FIG. 4 showing a diagram of a method, in accordance with some exemplary embodiments of the disclosed subject matter.

An original data layout of a structure 410 defines fields in a structure "str". A trace 420 indicates accesses to fields of instances in the structure 410. A window 425 may be utilized to define which indications of the trace 420 are considered proximate. The window 425 may slide from a beginning of the trace 420 to the end of the trace 420, such as in the direction of arrow 427. In other exemplary embodiments, the different locations of the window 425 may be traversed in a different order.

A CPG 430 may be utilized to represent access relations determined based on the traversal of the window 425 on the trace 420. The CPG may show, for example, that fields f1, f5 and fn are accessed in proximity. The CPG 430 may be utilized to show frequent functionality, exemplary functionality, representative functionality or the like. For example, it may be the case that fields connected with edges having relatively high weights may be grouped together. For example, it may be the case that at 30% of the accesses to field f1 the field fn of the same instance is also accessed. Such a correlation of 30% may be sufficiently higher than other correlations associated with either fields f1 and fn, and therefore f1 and fn may be grouped together. In some exemplary embodiments, The CPG may be partitioned into clusters, as is known in the art.

The CPG 430 may be partitioned into groups 440, such as based on SCCs of the CPG 430. For example, the second group of the groups 440 shows that the fields f1, f5 and fn are accessed in proximity.

An output data layout 450 may be determined based on the groups 440. For example, the fields f1, f5, and fn are grouped together, thus increasing the probability that they are retrieved and stored using a single cache line, a single data block or the like. Such a data layout may increase efficiency of operation of the target program.

The disclosed subject matter enables a relatively reliable estimation of field affinity. For example, consider the following code snippet ("code snippet 1"):

```
for i=0..3 {
    for j=0..3 {
        a[i].f2 = ...;
        ...;
        ... =a[j].f3;
    }
}
```

Accesses to fields f2 and f3 of the same instance are usually not performed in relation to one another in an execution of code snippet 1. In each iteration of the inner loop (which utilizes iteration index "j"), field f2 of instance a[i] is accessed. In addition, field f3 of instance "j" is accessed.

However, j and i are not related and in most cases point to different instances. Therefore, affinity between the fields f2 and f3 in the data layout is not likely to improve performance.

Consider the following code snippet ("code snippet 2"):

```
for i {
    a[i].f2 = ...;
    ...;
    ... =a[i+1].f3
}
```

Accesses to fields f2 and f3 of the same instance are correlated in code snippet 2. In each iteration, field f3 of the next instance is accessed, and immediately after that, field f2 of the same instance is also accessed. The disclosed subject matter may correctly determine the intra-loop a correlation between fields f3 and f2, although no inter-loop relation between the fields (in the same instance) exists.

In addition, the disclosed subject matter may correctly estimate affinity based on inter-loop operation (e.g., code within a loop) and intra-loop operation (e.g., code associated with consecutive iterations of the loop), and other operations (e.g., non-loop related; before the loop and within a first iteration; within a last iteration and after the loop; or the like).

In accordance with the disclosed subject matter, a trace format may comprise an instance indicator. The instance indicator may be determined at run time of the target program by taking the address of the accessed field. E.g., in case array A of structures "str" is accessed using the semantical representation A[i].f1, the address may be determined using the & operator in the C language (i.e., &(A[i].f1)) or similar manners in other language. As another example, accesses using a pointer (for example, p->f1) may be used in a similar manner: &(p->f1). The address of the field may be different for each field of the instance, as the instance comprises several fields. To determine the address of the instance bit size of the fields before the accessed fields may be subtracted. The subtraction may be performed either at creation of the trace or by an instance identification module such as 220 of FIG. 2. In some programming languages, such as for example Fortran, addresses and pointers are not available. A printout of the semantical representation may suffice, such as A[2] (e.g., when A[i] is being accessed and i=2), S (e.g., when variable S contains the structure) or the like.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computerized apparatus for determining an access relation between fields of a structure in a computer program, the computerized apparatus having a processor, the computerized apparatus comprising:
   a trace obtainer implemented by a processor and instructions thereto, and configured to obtain a trace associated with an execution of the computer program, the trace comprising at least one indication of access to a portion of the fields of the structure;
   an instance identification module implemented by a processor and instructions thereto, and configured to identify an instance of the structure accessed during the at least one indication of access;
   an access relation determination module implemented by a processor and instructions thereto, and configured to
      determine the access relation between at least two fields of the fields of the structure, wherein said the access relation determination module is configured to determine the access relation based on indications of accesses to the at least two fields in the instance of the structure,
      determine an order in which the at least two fields be being accessed based on the trace,
      update a Close Proximity Graph (CPG) based on the order, wherein the CPG having nodes representing the fields of the instance of the structure and having edges representing the access relation between the at least two fields of the instance of the structure; and
   a proximate access module configured to determine whether the accesses to the at least two fields in the instance of the structure are performed within a predetermine number of accesses;
   an optimization module configured to determine a data layout of the fields of the structure based on the access relation determined by said access relation determination module, the optimization module comprises a field grouper implemented by a processor and instructions thereto, and configured to determine groups of related fields based on the access relation determined by said access relation determination module, and partitioning the CPG into strongly connected components (SCCS); and
   a compiler compiling the program and utilizing the SCCS in the data layout.

2. The computerized apparatus of claim 1 further comprising:
   an execution module configured to execute the computer program; and wherein said trace obtainer is configured to obtain the trace based on the execution initiated by said execution module.

3. The computerized apparatus of claim 1, wherein said access relation determination module comprises a Close Proximity Graph module; and wherein said field grouper is a Close Proximity Graph partitioning module.

4. The computerized apparatus of claim 1, wherein said instance identification module is configured to identify an instance based on an address of the structure.

5. The computerized apparatus of claim 1, wherein said instance identification module is configured to identify an instance based on an array and an index value.

6. The computerized apparatus of claim 1, wherein said computerized apparatus is utilized by a compiler; and wherein said compiler performs a compile time data layout optimization.

7. A computer-implemented method for determining an access relation between fields of a structure in a computer program, the method comprising:
   obtaining a trace associated with an execution of the computer program, the trace comprising at least one indication of access to a portion of the fields of the structure;
   analyzing the trace, wherein said analyzing the trace is performed by a processor, wherein said analyzing the trace comprises:
      identifying an instance of the structure associated with the at least one indication of access;
      determining the access relation between at least two fields of the fields of the structure, comprising
         determining the access relation based on indications of accesses to the at least two fields in the instance of the structure,
         determining an order in which the at least two fields be being accessed based on the trace,
         updating a Close Proximity Graph (CPG) based on the order, wherein the CPG having nodes representing the fields of the instance of the structure and having edges representing the access relation between the at least two fields of the instance of the structure,
         determining whether the accesses to the at least two fields in the instance of the structure are performed within a predetermine number of accesses, and
      determining a group of related fields based on the access relation, and partitioning the CPG into strongly connected components (SCCS); and
   determining a data layout of the fields of the structure based on the SCCS; and
   compiling the computer program and utilizing the data layout.

8. The method of claim 7, wherein said obtaining the trace comprises executing the computer program.

9. The method of claim 8, wherein said executing the computer program comprises: instrumenting the computer program to provide an instrumented computer program; and executing the instrumented computer program.

10. The method of claim 7, wherein said determining the access relation comprises: utilizing a Close Proximity Graph having nodes representing the fields of the structure and having edges representing the access relation between the at least two fields.

11. The method of claim 10, wherein said determining a data layout of the fields comprises partitioning the Close Proximity Graph into strongly connected components.

12. The method of claim 7, wherein said identifying an instance of the structure comprises utilizing an instance identifier selected from the group consisting of an address of the structure and a tuple comprising an array and an index associated with the structure.

13. The method of claim 7, wherein determining the access relation comprises: determining an order in which the at least two fields are being accessed based on the trace, wherein the at least two fields are being accessed within a predetermined number of accesses.

14. The method of claim 7, wherein said method is utilized during compilation of the computer program.

15. The method of claim 7, wherein said method is utilized to perform field affinity optimization.

16. The method of claim 7 being performed multiple times, each time with respect to a different structure.

17. A computer program product for determining an access relation between fields of a structure in a computer program, the product comprising:
- a non-transitory computer readable medium;
- a first program instruction for obtaining a trace associated with an execution of the computer program, the trace comprising at least one indication of access to a portion of the fields of the structure;
- a second program instruction for analyzing the trace, wherein said second program instruction comprises:
- a third program instruction for identifying an instance of the structure associated with the at least one indication of access;
- a fourth program instruction for determining the access relation between at least two fields of the fields of the structure, comprising
    - determining the access relation based on indications of accesses to the at least two fields in the instance of the structure,
    - determining an order in which the at least two fields be being accessed based on the trace,
    - updating a Close Proximity Graph (CPG) based on the order, wherein the CPG having nodes representing the fields of the instance of the structure and having edges representing the access relation between the at least two fields of the instance of the structure, determining whether the accesses to the at least two fields in the instance of the structure are performed within a pre-determine number of accesses, and
    - determining a group of related fields based on the access relation and partitioning the CPG into strongly connected components (SCCS); and
- a fifth program instruction for determining a data layout of the fields of the structure based on the SCCS; and
- a sixth program instruction for compiling the computer program and utilizing the data layout,
- wherein said first, second, third, fourth; fifth, and sixth program instructions are stored on said non-transitory computer readable medium.

\* \* \* \* \*